(12) United States Patent
Ahn et al.

(10) Patent No.: US 12,514,129 B2
(45) Date of Patent: Dec. 30, 2025

(54) MAGNETIC MEMORY DEVICE

(71) Applicants: Kioxia Corporation, Tokyo (JP); SK hynix Inc., Icheon-si (KR)

(72) Inventors: Hyung-Woo Ahn, Seongnam-si (KR); Tadaaki Oikawa, Seoul (KR); Taiga Isoda, Tokyo (JP); Kenji Fukuda, Seoul (KR); Ku Youl Jung, Icheon-si (KR)

(73) Assignees: Kioxia Corporation, Tokyo (JP); SK hynix Inc., Gyeonggi-Do (KR)

( * ) Notice: Subject to any disclaimer, the term of this patent is extended or adjusted under 35 U.S.C. 154(b) by 138 days.

(21) Appl. No.: 18/599,458

(22) Filed: Mar. 8, 2024

(65) Prior Publication Data

US 2024/0315143 A1    Sep. 19, 2024

(30) Foreign Application Priority Data

Mar. 14, 2023    (JP) .................... 2023-039668

(51) Int. Cl.
| | | |
|---|---|---|
| *G11C 11/16* | (2006.01) | |
| *H10B 61/00* | (2023.01) | |
| *H10N 50/10* | (2023.01) | |
| *H10N 50/85* | (2023.01) | |

(52) U.S. Cl.
CPC .......... *H10N 50/10* (2023.02); *G11C 11/161* (2013.01); *H10B 61/10* (2023.02); *H10N 50/85* (2023.02)

(58) Field of Classification Search
CPC ........ H10N 50/10; H10N 50/85; H10N 50/01; G11C 11/161; H10B 61/10; H10B 61/22
USPC .................................... 365/158, 173
See application file for complete search history.

(56) References Cited

U.S. PATENT DOCUMENTS

| | | | |
|---|---|---|---|
| 10,580,964 B2 | 3/2020 | Park et al. | |
| 11,165,016 B2 | 11/2021 | Sonoda | |
| 2010/0188893 A1* | 7/2010 | Zhou ............... | G11C 11/1659 365/171 |
| 2011/0233700 A1* | 9/2011 | Hayakawa ........ | B82Y 25/00 257/E29.323 |
| 2014/0021426 A1 | 1/2014 | Lee et al. | |
| 2018/0309048 A1* | 10/2018 | Ochiai ............. | H10N 50/85 |
| 2019/0229259 A1* | 7/2019 | Park .................. | H10N 50/10 |
| 2022/0085278 A1* | 3/2022 | Igarashi ............ | H10N 50/10 |
| 2022/0093848 A1 | 3/2022 | Kitagawa et al. | |
| 2022/0399487 A1* | 12/2022 | Yamada ............ | H10B 61/22 |

OTHER PUBLICATIONS

U.S. Appl. No. 18/337,576, First Named Inventor: Hyungwoo Ahn; Title: "Magnetoresistance Memory Device and Method for Manufacturing Magnetoresistance Memory Device"; Filed: Jun. 20, 2023.

* cited by examiner

*Primary Examiner* — Michael T Tran
(74) *Attorney, Agent, or Firm* — Holtz, Holtz & Volek PC

(57) ABSTRACT

According to one embodiment, a magnetic memory device includes a memory cell. The memory cell includes a switching element, a magnetoresistance effect element, and an electrode that electrically couples the switching element to the magnetoresistance effect element. The electrode includes: a first non-magnetic layer being in contact with the switching element; and a second non-magnetic layer provided on a side opposite to a side on which the switching element is provided with respect to the first non-magnetic layer. The second non-magnetic layer has an amorphous structure and contains a metal oxide or a metal nitride.

16 Claims, 8 Drawing Sheets

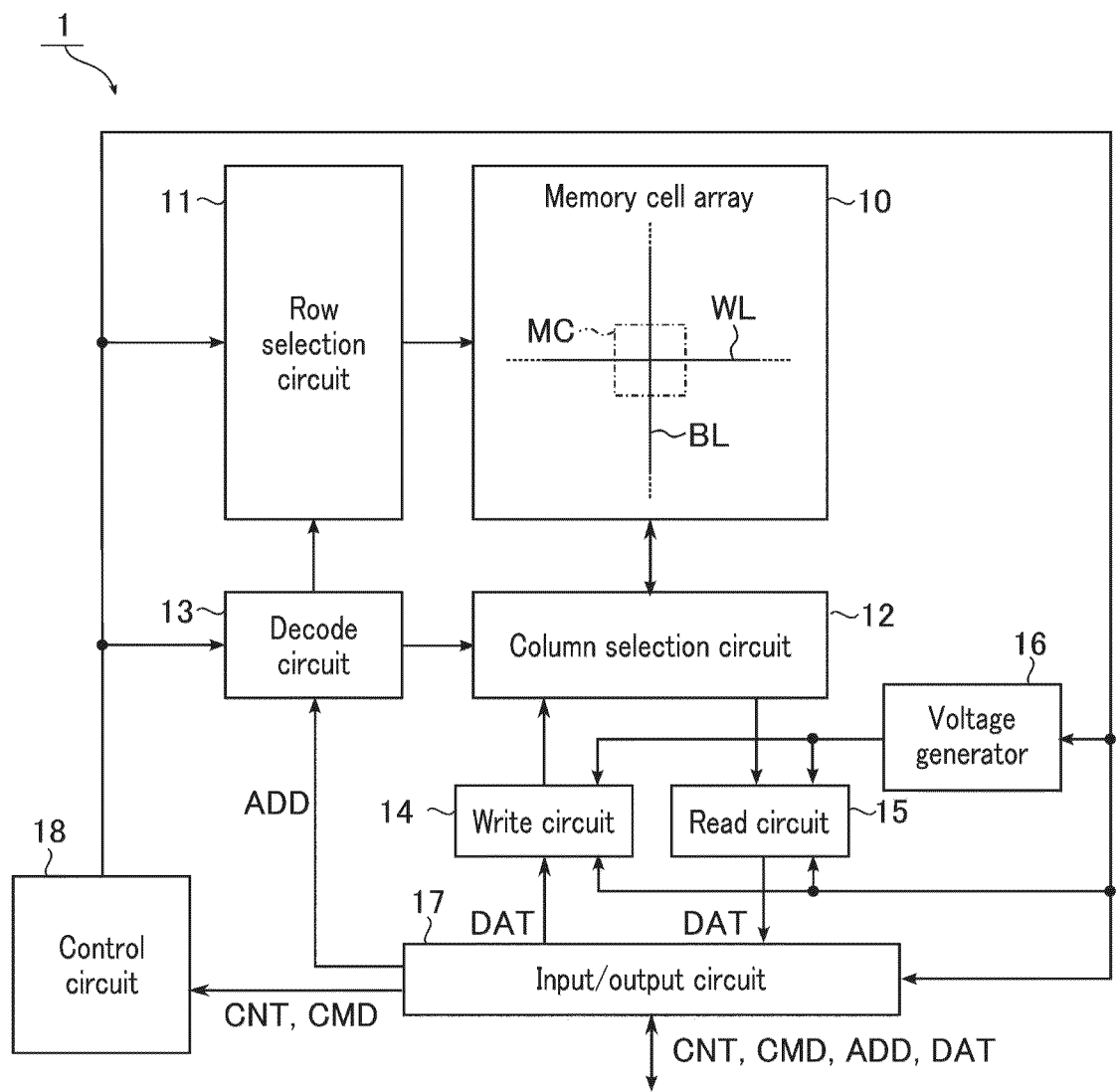
F I G. 1

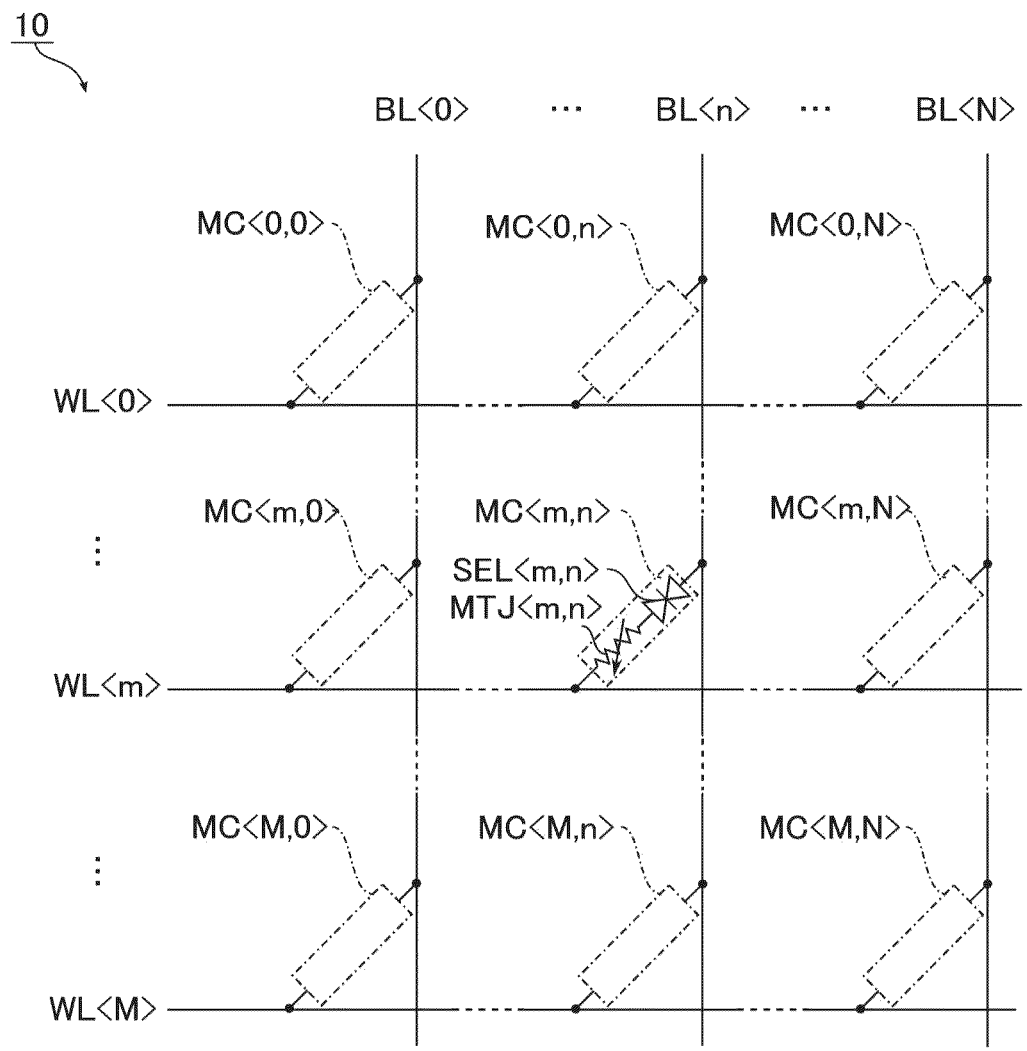
F I G. 2

| | First comparative example | Second comparative example | Example |
|---|---|---|---|
| Ra (nm) | 0.247 | 0.277 | 0.368 |
| Hex (Oe) | – | 11e3 | 13e3 |
F I G. 14
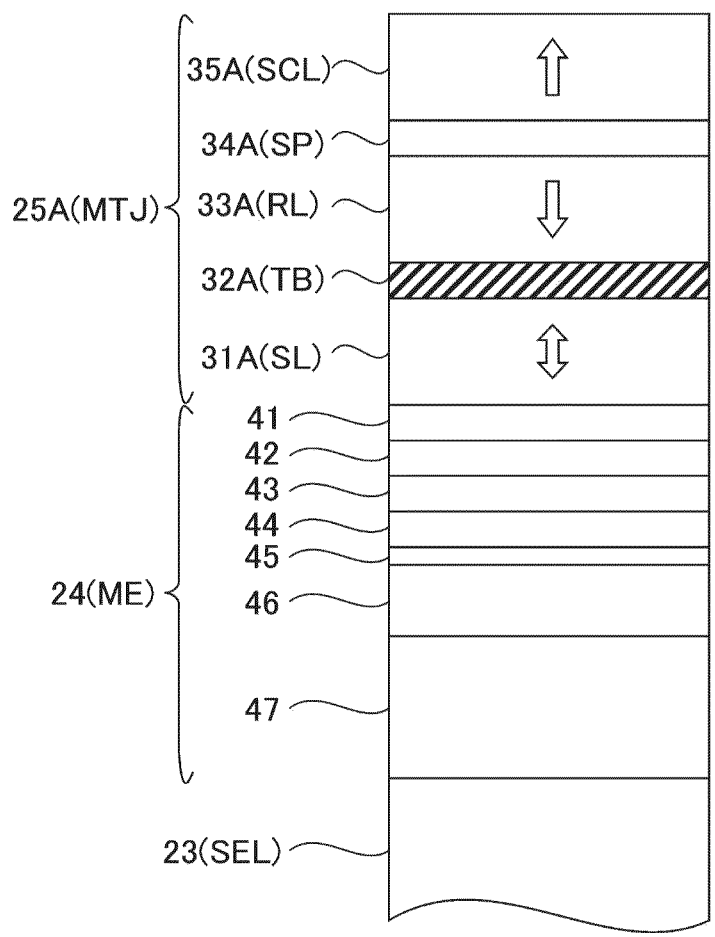
F I G. 15

MAGNETIC MEMORY DEVICE

CROSS-REFERENCE TO RELATED APPLICATIONS

This application is based upon and claims the benefit of priority from Japanese Patent Application No. 2023-039668, filed Mar. 14, 2023, the entire contents of which are incorporated herein by reference.

FIELD

Embodiments described herein relate generally to a magnetic memory device.

BACKGROUND

A memory device using a magnetoresistance effect element as a storage element is known. A magnetoresistance effect element functions as a memory cell when coupled to a switching element in series.

BRIEF DESCRIPTION OF THE DRAWINGS

FIG. 1 is a block diagram showing a configuration example of a magnetic memory device according to an embodiment.

FIG. 2 is a circuit diagram showing a circuit configuration example of a memory cell array according to the embodiment.

FIG. 14 is a diagram showing a result of comparison of properties of a memory cell according to an example to those of a memory cell according to each of the first comparative example and the second comparative example.

FIG. 15 is a cross-sectional view of a cross-sectional structure of a magnetoresistance effect element and a middle electrode according to a modification.

DETAILED DESCRIPTION

Figure 3:
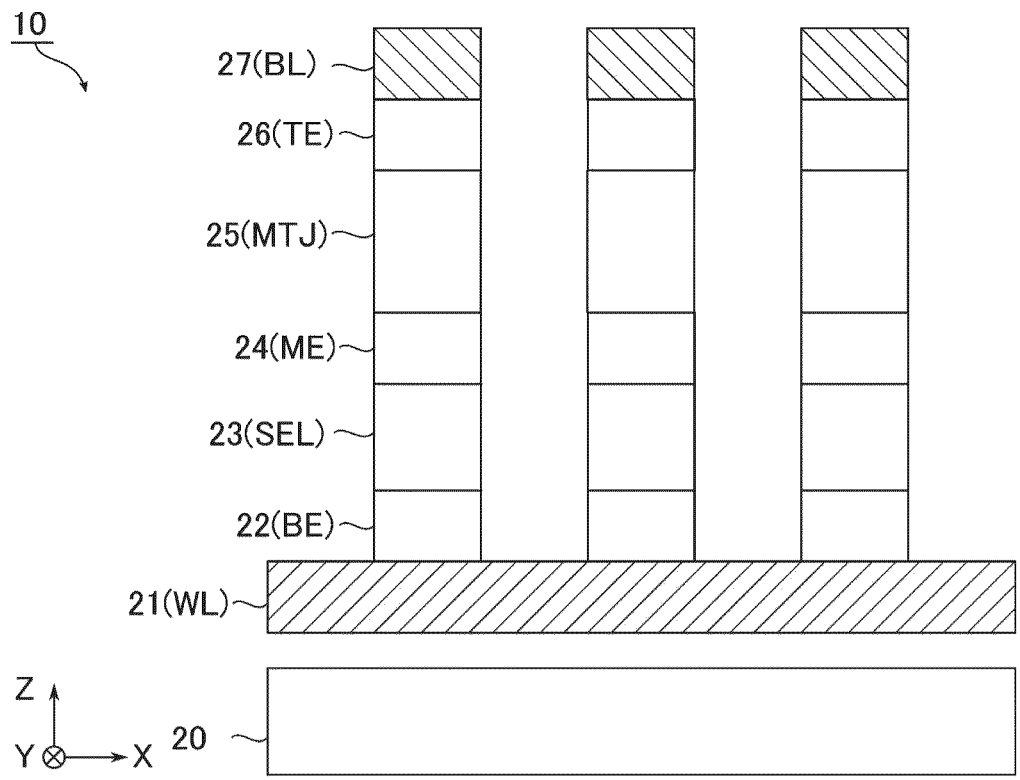
FIG. 3 is a cross-sectional view of an example of a cross-sectional structure of a memory cell array according to the embodiment.

In general, according to one embodiment, a magnetic memory device includes a memory cell. The memory cell includes a switching element a magnetoresistance effect element, and an electrode that electrically couples the switching element to the magnetoresistance effect element. The electrode includes: a first non-magnetic layer being in contact with the switching element; and a second non-magnetic layer provided on a side opposite to a side on which the switching element is provided with respect to the first non-magnetic layer. The second non-magnetic layer has an amorphous structure and contains a metal oxide or a metal nitride.

Hereinafter, the embodiments will be described with reference to the accompanying drawings. In the descriptions below, components having similar functions and configurations will be denoted by the same reference symbols. The following embodiments illustrate the technical concept. The embodiments are not intended to limit the materials, shapes, structures, arrangements, etc. of the components to those described herein. Various modifications can be made to the embodiments.

In the present description, a magnetic memory device is a magnetoresistance random access memory (MRAM), for example. A magnetic memory device includes a magnetoresistance effect element as a storage element. The magnetoresistance effect element is a type of variable resistance element having a magnetoresistance effect brought by a magnetic tunnel junction (MTJ). The magnetoresistance effect element may be called an "MTJ element."

In the present description, an "A/B stacked film" refers to a stacked structure of a film containing element A and a film containing element B.

1. Embodiment

An embodiment is described.
1.1 Configuration
First, a configuration of a magnetic memory device according to the embodiment is described.
1.1.1 Magnetic Memory Device
FIG. 1 is a block diagram showing a configuration example of a magnetic memory device according to the embodiment. The magnetic memory device 1 includes a memory cell array 10, a row selection circuit 11, a column selection circuit 12, a decode circuit 13, a write circuit 14, a read circuit 15, a voltage generator 16, an input/output circuit 17, and a control circuit 18.

The memory cell array 10 is a data storage unit in the magnetic memory device 1. The memory cell array 10 includes a plurality of memory cells MC. Each of the memory cells MC is associated with a set of a row and a column. The memory cells MC present on the same row are coupled to the same word line WL. The memory cells MC present on the same column are coupled to the same bit line BL.

The row selection circuit 11 is a circuit for selecting a row of the memory cell array 10. The row selection circuit 11 is coupled to the memory cell array 10 via word lines WL. The row selection circuit 11 is supplied with a result of decoding an address ADD from the decode circuit 13 (row address). The row selection circuit 11 selects a word line WL corresponding to a row based on the address ADD decoding result. Hereinafter, a selected word line WL will be called a "selected word line WL". Word lines WL other than a selected word line WL will be called a "non-selected word lines WL".

The column selection circuit 12 is a circuit for selecting a column of the memory cell array 10. The column selection circuit 12 is coupled to the memory cell array 10 via a bit line BL. The column selection circuit 12 is supplied with a result of decoding an address ADD received from the decode circuit 13 (column address). The column selection circuit 12 selects a bit line BL corresponding to a column based on the result of decoding an address ADD. Hereinafter, a selected bit line BL will be called a "selected bit line BL". Bit lines BL other than a selected bit line BL will be called a "non-selected bit lines BL".

The decode circuit 13 is a decoder that decodes an address ADD received from the input/output circuit 17. The decode circuit 13 supplies the result of decoding the address ADD to the row selection circuit 11 and the column selection circuit 12. The address ADD includes a column address and a row address.

The write circuit 14 includes a write driver (not shown), for example. The write circuit 14 writes data to the memory cells MC.

The read circuit 15 includes a sense amplifier (not shown) for example. The read circuit 15 reads data from the memory cells MC.

The voltage generator 16 generates voltages for various types of operations in the memory cell array 10, using a power supply voltage supplied from a device (not shown) externally to the magnetic memory device 1. For example, the voltage generator 16 generates various types of voltages required for a write operation and outputs the voltages to the write circuit 14. In addition, the voltage generator 16, for example, generates various types of voltages required for a read operation and outputs the voltages to the read circuit 15.

The input/output circuit 17 governs communications outside of the magnetic memory device 1. The input/output circuit 17 forwards an address ADD received from the outside of the magnetic memory device 1 to the decode circuit 13. The input/output circuit 17 forwards a command CMD received from the outside of the magnetic memory device 1 to the control circuit 18. The input/output circuit 17 sends and receives various control signals CNT between the outside of the magnetic memory device 1 and the control circuit 18. The input/output circuit 17 transfers data DAT received from the outside of the magnetic memory device 1 to the write circuit 14, and outputs data DAT transferred from the read circuit 15 to the outside of the magnetic memory device 1.

The control circuit 18 includes, for example, a processor, such as a central processing unit (CPU), a read only memory (ROM), and a random access memory (RAM). The control circuit 18 controls, based on a control signal CNT and a command CMD, the circuits included in the magnetic memory device 1, namely the row selection circuit 11, the column selection circuit 12, the decode circuit 13, the write circuit 14, the read circuit 15, the voltage generator 16, and the input/output circuit 17.

1.1.2 Circuit Configuration of Memory Cell Array

Next, an example of a circuit configuration of a memory cell array of the magnetic memory device according to the embodiment is described.

FIG. 2 is a diagram showing an example of the circuit configuration of a memory cell array according to the embodiment. In FIG. 2, each of the word lines WL and the bit lines BL is shown, being distinguished by appended symbols including an index ("< >").

The memory cell array 10 includes a plurality of memory cells MC, a plurality of word lines WL, and a plurality of bit lines BL. In the example shown in FIG. 2, a plurality of memory cells MC include (M+1)×(N+1) memory cells, MC<0, 0>, ..., MC<0, n>, ..., MC<0, N>, ..., MC<m, 0>, ..., MC<m, n>, ..., MC<m, N>, ..., MC<M, 0>, ..., MC<M, n>, ..., and MC<M, N> (each of M and N is an integer equal to or greater than 1, 0≤m≤M, 0≤n≤N). M and N are integers equal to or greater than 1 in the example of FIG. 2; however, the embodiment is not limited to this example. M and N may be 0. The plurality of word lines WL include (M+1) word lines, WL<0>, ..., WL<m>, ..., WL<M>. The plurality of bit lines BL include (N+1) word lines, BL<0>, ..., BL<n>, BL<N>.

A plurality of memory cells MC are arranged in a matrix pattern within a memory cell array 10. Each memory cell MC is associated with a set of one of the plurality of word lines WL and one of the plurality of bit lines BL. In other words, memory cell MC<m, n> is coupled to word line WL<m> and bit line BL<n>.

Memory cell MC<m, n> is a 2-terminal type memory cell having a first end coupled to word line WL<m> and a second end coupled to bit line BL<n>. Memory cell MC<m, n> includes switching element SEL<m, n> and magnetoresistance effect element MTJ<m, n>.

A switching element SEL is a 2-terminal type switching element. A 2-terminal type switching element, which does not have third terminal, differs from a 3-terminal type switching element such as a transistor. If a voltage applied between two terminals is smaller than a threshold voltage Vth, the switching element SEL is in a "high-resistance" state or "off" state, e.g., an electrically non-conductive state. If a voltage applied between two terminals is equal to or greater than a threshold voltage Vth, the switching element SEL transitions to a "low-resistance" state or "on" state, e.g., an electrically conductive state. More specifically, for example if a voltage applied to a corresponding memory cell MC is lower than a threshold voltage Vth, the switching element SEL interrupts a current (turns to an off state), serving as an insulator having a large resistance value. If a voltage applied to a corresponding memory cell MC is equal to or greater than a threshold voltage Vth, the switching element SEL passes a current (turns to an on state), serving as an insulator having a small resistance value. The switching element SEL switches between passing a current and interrupting a current in accordance with a magnitude of a voltage applied to a corresponding memory cell MC, regardless of a polarity of the voltage applied to the two terminals (regardless of the direction of the current passing between the two terminals).

The magnetoresistance effect element MTJ is a variable resistance element. With a current whose path is controlled by the switching element SEL, a resistance value of a corresponding magnetoresistance effect element MTJ can be switched between a low-resistance state and a high-resistance state. The magnetoresistance effect element MTJ functions as a storage element that stores data in a non-volatile manner through the change in its resistance state.

1.1.3 Cross-Sectional Structure of Memory Cell Array

Next, the cross-sectional structure of the memory cell arrays according to the embodiment is described.

Figure 4:
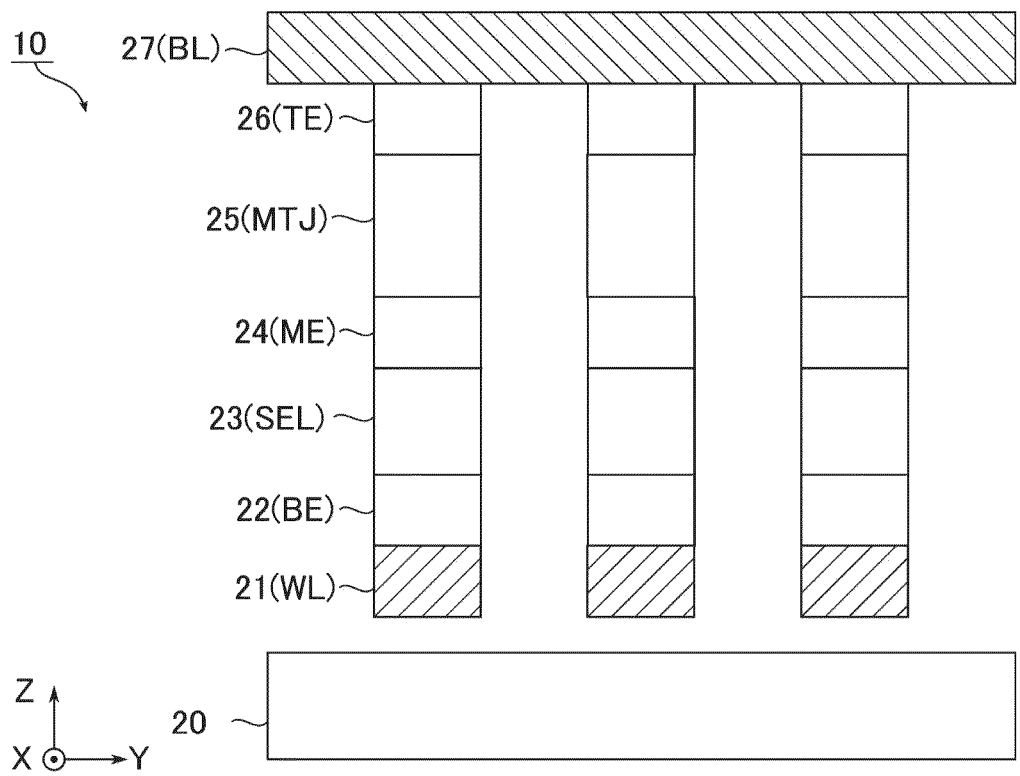
FIG. 4 is a cross-sectional view of an example of a cross-sectional structure of a memory cell array according to the embodiment.

FIGS. 3 and 4 are cross-sectional views of an example of a cross-sectional structure of a memory cell array according to the embodiment. As shown in FIGS. 3 and 4, the memory cell array 10 is provided above the substrate 20. Both the plane along the cross-sectional view shown in FIG. 3 and the plane along the cross-sectional view shown in FIG. 4 intersect with the surface of the substrate 20, and intersect with each other.

In the following description, a plane parallel to the surface of the substrate 20 will be referred to as an "XY plane". The directions intersecting each other on the XY plane are defined as an X direction and a Y direction. The direction intersecting the XY plane is defined as a Z direction. Specifically, the direction from the substrate 20 toward the memory cell array 10 may be called an "upward direction". The direction from the memory cell array 10 to the substrate 20 may be called a "downward direction".

The memory cell array 10 includes a plurality of conductive layers 21, a plurality of electrode layers 22, a plurality of element layers 23, a plurality of electrode layers 24, a plurality of element layers 25, a plurality of electrode layers 26, and a plurality of conductive layers 27.

A peripheral circuit, such as the row selection circuit 11 and the column selection circuit 12, etc., may be provided between the substrate 20 and the memory cell array 10. A peripheral circuit is not necessarily formed between the substrate 20 and the memory cell array 10. If a peripheral circuit is not formed between the substrate 20 and the memory cell array 10, a shallow trench isolation (STI) may be formed in the substrate 20 in the part located below the memory cell array 10.

A plurality of conductive layers 21 are provided above the substrate 20. Each of the conductive layer 21 extends in the X direction. The plurality of conductive layers 21 are arranged side by side in the Y direction. Each of the plurality of conductive layers 21 is used as a word line WL.

On the upper surface of each of the conductive layers 21, the plurality of electrode layers 22 are provided. The plurality of electrode layers 22 provided on the upper surface of the same conductive layer 21 are arranged side by side in the X direction. Each of the plurality of electrode layers 22 is used as a bottom electrode BE.

On the upper surface of each of the electrode layers 22, one corresponding element layer 23 is provided. Each of the element layers 23 is used as a switching element SEL. The element layers 23 may be called switching layers 23. Although the switching element SEL may be called a switching layer SEL, the word "switching element SEL" is used in the following description.

On the upper surface of each of the element layers 23, one corresponding electrode layer 24 is provided. Each of the plurality of electrode layers 24 is used as a middle electrode ME.

On the upper surface of each of the electrode layers 24, one corresponding element layer 25 is provided. Each of the element layers 25 is used as a magnetoresistance effect element MTJ. The element layers 25 may be called MTJ layers 25. Although the magnetoresistance effect element MTJ may be called a magnetoresistance effect element layer MTJ, the word "magnetoresistance effect element MTJ" is used in the following description.

On the upper surface of each of the element layers 25, one corresponding electrode layer 26 is provided. Each of the plurality of electrode layers 26 is used as an top electrode TE.

A single conductive layer 27 extending in the Y direction is provided in such a manner that it is in contact with each of the plurality of electrode layers 26 arranged side by side in the Y direction. The plurality of conductive layers 27 are arranged side by side in the X direction. Each of the plurality of conductive layers 27 is used as a bit line BL.

1.1.4 Structure of Magnetoresistive Effect Element

Next, a structure of a magnetoresistance effect element according to the embodiment is described.

Figure 5:
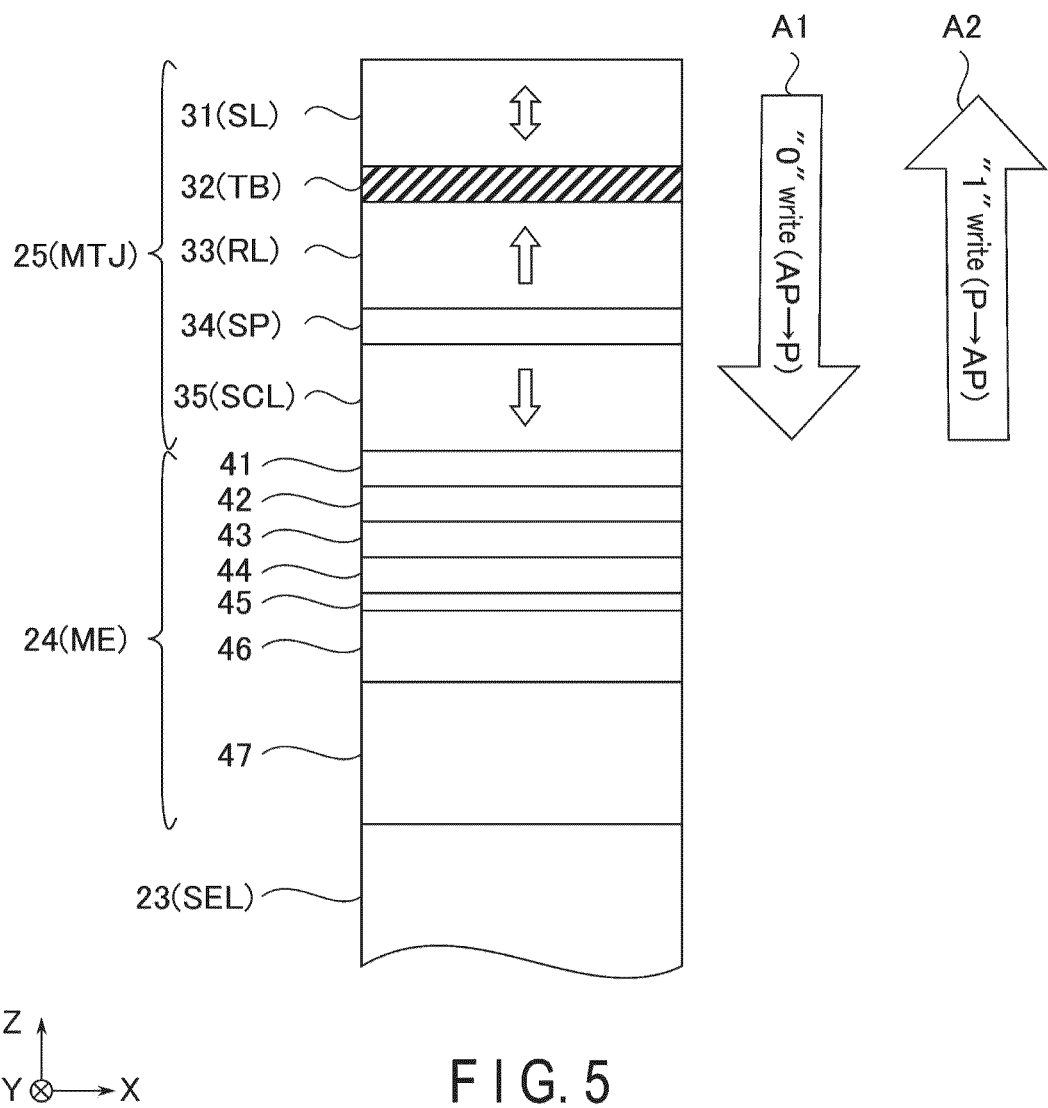
FIG. 5 is a cross-sectional view of a cross-sectional structure of a magnetoresistance effect element and a middle electrode according to the embodiment.

FIG. 5 is a cross-sectional view of a cross-sectional structure of a magnetoresistance effect element and a middle electrode according to the embodiment. FIG. 5 shows a part of the element layer 23, the electrode layer 24 provided on the upper surface of the element layer 23, and the element layer 25 provided on the upper surface of the electrode layer 24.

The element layer 25 used as a magnetoresistance effect element MTJ includes a ferromagnetic layer 31, a non-magnetic layer 32, a ferromagnetic layer 33, a non-magnetic layer 34, and a ferromagnetic layer 35.

The ferromagnetic layer 31 is an electric conductive film having ferromagnetic properties. The ferromagnetic layer 31 has an axis of easy magnetization in a direction perpendicular to the film plane (Z direction). The ferromagnetic layer 31 includes iron (Fe). The ferromagnetic layer 31 may further include at least one of cobalt (Co) or nickel (Ni). The ferromagnetic layer 31 may further include boron (B). Specifically, the ferromagnetic layer 31 may include, for example, cobalt-iron-boron (CoFeB), iron boride (FeB), or cobalt boride (CoB). The ferromagnetic layer 31 is used as a storage layer SL.

On the lower surface of the ferromagnetic layer 31, the non-magnetic layer 32 is provided. The non-magnetic layer 32 is an insulating film having non-magnetic properties. The non-magnetic layer 32 is used as a tunnel barrier layer TB. The non-magnetic layer 32 is provided between the ferromagnetic layer 31 and the ferromagnetic layer 33, and forms a magnetic tunnel junction in conjunction with these ferromagnetic layers 31 and 33. Furthermore, if an initial amorphous layer such as cobalt-iron-boron (CoFeB) is used as the interface layer of the ferromagnetic layer 31 and the ferromagnetic layer 33, the non-magnetic layer 32 functions as a seed material that provides a nucleus that grows a crystalline film from the interface with the ferromagnetic layer 31 in the crystallization of the ferromagnetic layer 31. Similarly, when cobalt-iron-boron (CoFeB) is used as an interface layer of the ferromagnetic layer 33, the non-magnetic layer 32 functions as a seed material to the ferromagnetic layer 33. Herein, an initial amorphous layer is a layer which is in an amorphous state immediately after the film is formed and which crystalizes after annealing. The non-magnetic layer 32 has a tetragonal or cubic structure with its film plane oriented in a (001) plane. An example of an oxide used in the non-magnetic layer 32 is magnesium oxide (MgO) for example. Magnesium oxide (MgO) has a NaCl structure. If magnesium oxide (MgO) is used as the non-magnetic layer 32, the (001) interface of magnesium oxide (MgO) and the (001) interface of cobalt-iron-boron (CoFeB) are aligned. For this reason, crystals of cobalt-iron-boron (CoFeB) grow through annealing, and cobalt-iron-boron (CoFeB) has a (001)-oriented, body-centered cubic structure.

On the lower surface of the non-magnetic layer 32, the ferromagnetic layer 33 is provided. The ferromagnetic layer 33 is an electric conductive film having ferromagnetic properties. The ferromagnetic layer 33 is used as a reference layer RL. The ferromagnetic layer 33 has an axis of easy magnetization in a direction perpendicular to the film plane (Z direction). The magnetization direction of the ferromagnetic layer 33 is fixed. In the example shown in FIG. 5, the magnetization direction of the ferromagnetic layer 33 is in the direction of the ferromagnetic layer 31. "Fixed magnetization direction" indicates the magnetization direction being unchanged by a torque large enough to reverse the magnetization direction of the ferromagnetic layer 31. Usually, an interface layer is used for the ferromagnetic layer 33. As an interface layer of the ferromagnetic layer 33, an initial amorphous layer, such as cobalt-iron-boron (CoFeB), etc., is used. Furthermore, of the cobalt-iron-boron (CoFeB) layer, a secondary ferromagnetic layer is provided in such a manner that it faces a surface opposite to the surface in contact with the magnesium oxide (MgO) layer. The secondary ferromagnetic layer contains at least one alloy film selected from the group consisting of, for example, cobalt platinum (CoPt), cobalt nickel (CoNi), and cobalt palladium (CoPd). The secondary ferromagnetic layer is a stacked film, such as a Co/Pt stacked film or a Co/Pd stacked film. The cobalt-iron-boron (CoFeB) layer that serves as an initial amorphous layer is stacked with a CoPt, CoPd, Co/Pt, or Co/Pd stacked film when used. In this case, in the interface layer of the ferromagnetic layer 33, for example the above-described CoFeB layer, (001)-oriented MgO is formed in the non-magnetic layer 32 side compared to the other layers.

On the lower surface of the ferromagnetic layer 33, the non-magnetic layer 34 is provided. The non-magnetic layer 34 is an electric conductive film having non-magnetic properties. The non-magnetic layer 34 is used as a spacer layer SP. The non-magnetic layer 34 is made of an element selected from the group consisting of ruthenium (Ru), osmium (Os), rhodium (Rh), iridium (Ir), vanadium (V), and chrome (Cr) or an alloy thereof. The film thickness of the non-magnetic layer 34 is equal to or less than 2 nm.

On the lower surface of the non-magnetic layer 34, the ferromagnetic layer 35 is provided. The ferromagnetic layer 35 is an electric conductive film having ferromagnetic properties. The ferromagnetic layer 35 is used as a shift cancelling layer SCL. The ferromagnetic layer 35 has an axis of easy magnetization in a direction perpendicular to the film plane (Z direction). The ferromagnetic layer 35 contains at least one alloy layer selected from the group consisting of, for example, cobalt platinum (CoPt), cobalt nickel (CoNi), and cobalt palladium (CoPd). The ferromagnetic layer 35 may be a stacked film, such as a Co/Pt stacked film and a Co/Pd stacked film.

The ferromagnetic layer 33 and the ferromagnetic layer 35 are antiferromagnetically coupled by the non-magnetic layer 34. That is, the ferromagnetic layer 33 and the ferromagnetic layer 35 are coupled in such a manner that their magnetization directions are anti-parallel to each other. Such a coupling structure between the ferromagnetic layer 33, the non-magnetic layer 34, and the ferromagnetic layer 35 is called an "SAF (synthetic antiferromagnetic) structure". This SAF structure allows the ferromagnetic layer 35 to cancel the influence by a leaked magnetic field of the ferromagnetic layer 33 on the change of the magnetization direction of the ferromagnetic layer 31. The ferromagnetic layer 35 can thereby reduce a substantial leaked magnetic field of the ferromagnetic layer 33.

The magnetoresistance effect element MTJ may take either a low-resistance state or a high-resistance state, depending on whether the relative relationship between the magnetization directions of the storage layer SL and the reference layer RL is parallel or anti-parallel. In the embodiment, the magnetization direction of the storage layer SL with respect to the magnetization direction of the reference layer RL is controlled by supplying a write current to such a magnetoresistance effect element MTJ. Specifically, a write method using a spin transfer torque caused by supplying a current to a magnetoresistance effect element MTJ is adopted.

If a write current Ic0 having a certain amplitude is let pass in the magnetoresistance effect element MTJ from the storage layer SL to the reference layer RL, namely the direction of arrow A1 in FIG. 5, the relative relationship of the magnetization direction between the storage layer SL and the reference layer RL becomes parallel. In this parallel state, the resistance value of the magnetoresistance effect element MTJ becomes smaller, and the magnetoresistance effect element MTJ is set to a low-resistance state. This low-resistance state is called a "P (parallel) state", and is defined as a data "0" state.

If a write current Ic1, which is larger than the write current Ic0, is let pass in the magnetoresistance effect element MTJ from the reference layer RL to the storage layer SL, namely in the direction of arrow A2 in FIG. 5, the relative relationship of the magnetization direction between the storage layer SL and the reference layer RL becomes anti-parallel. In this antiparallel state, the resistance value of the magnetoresistance effect element MTJ becomes greatest, and the magnetoresistance effect element MTJ is set to a high-resistance state. This high-resistance state is called an "AP (anti-parallel) state", and is defined as, for example, the state of data "1".

How data "1" and data "0" are defined is not limited to the above-described example. For example, the P state may be defined as data "1", and the AP state may be defined as data "0".

1.1.5 Structure of Middle Electrode

The structure of a middle electrode according to the embodiment will be described with reference to FIG. 5.

The electrode layer 24 used as a middle electrode ME includes a non-magnetic layer 41, a non-magnetic layer 42, a non-magnetic layer 43, a non-magnetic layer 44, a non-magnetic layer 45, a non-magnetic layer 46, and a non-magnetic layer 47.

On the lower surface of the ferromagnetic layer 35, the non-magnetic layer 41 is provided. The non-magnetic layer 41 is an electric conductive film having non-magnetic properties. The non-magnetic layer 41 includes silicon (Si) and boron (B), for example. The non-magnetic layer 41 has a function of suppressing diffusion of an element that degrades magnetic properties into a magnetoresistance effect element MTJ as impurities.

On the lower surface of the non-magnetic layer 41, the non-magnetic layer 42 is provided. The non-magnetic layer 42 is an electric conductive film having non-magnetic properties. The non-magnetic layer 42 contains platinum (Pt), for example. On the lower surface of the non-magnetic layer 42, the non-magnetic layer 43 is provided. The non-magnetic layer 43 is an electric conductive film having non-magnetic properties. The non-magnetic layer 43 contains tantalum (Ta), for example. The non-magnetic layers 42 and 43 have a function of improving a tunnel magnetoresistance ratio (TMR) of a magnetoresistance effect element MTJ.

On the lower surface of the non-magnetic layer 43, the non-magnetic layer 44 is provided. The non-magnetic layer 44 is an electric conductive film having non-magnetic properties. The non-magnetic layer 44 contains hafnium (Hf), for example. The non-magnetic layer 44 may further include boron (B). The non-magnetic layer 44 having an amorphous structure has a function of initializing the crystallinity of the layers located above the non-magnetic layer 44 with respect to the layers located below the non-magnetic layer 44.

On the lower surface of the non-magnetic layer 44, the non-magnetic layer 45 is provided. The non-magnetic layer 45 is an electric conductive film having non-magnetic properties. The non-magnetic layer 45 contains an oxide of an element contained in the non-magnetic layer 46, for example. The non-magnetic layer 45 may have a function of suppressing diffusion of impurities such as carbon (C) contained in the non-magnetic layer 47 into a magnetoresistance effect element MTJ.

On the lower surface of the non-magnetic layer 45, the non-magnetic layer 46 is provided. The non-magnetic layer 46 is an electric conductive film having non-magnetic properties. The non-magnetic layer 46 having an amorphous structure may have a function of initializing the crystallinity of the layers located above the non-magnetic layer 46 with respect to the layers located below the non-magnetic layer 46. The non-magnetic layer 46 having a chemically stable structure may have a function of suppressing diffusion of impurities such as carbon (C) contained in the non-magnetic layer 47 into a magnetoresistance effect element MTJ. The non-magnetic layer 46 may contain a metal oxide or a metal nitride, for example. The non-magnetic layer 46 contains at least one compound selected from WSiN, WSiO, SiN, SiB, AlO, NiCr, TiN, InO, CuSi, WN, and TaN.

On the lower surface of the non-magnetic layer 46, the non-magnetic layer 47 is provided. The non-magnetic layer 47 is an electric conductive film having non-magnetic properties. The non-magnetic layer 47 may contain carbon (C), for example. The non-magnetic layer 47 may further include nitride (N). The lower surface of the non-magnetic layer 47 is in contact with the upper surface of the element layer 23. The non-magnetic layer 47 has a function of increasing a flatness of the layers located above the non-magnetic layer 47.

1.2 Manufacturing Method

Next, a manufacturing method of the magnetic memory device according to the embodiment is described.

FIGS. 6 to 10 are cross-sectional views of a cross-sectional structure of a middle electrode that constitutes a memory cell of the magnetic memory device according to the embodiment, in the middle of manufacturing process.

Figure 6:
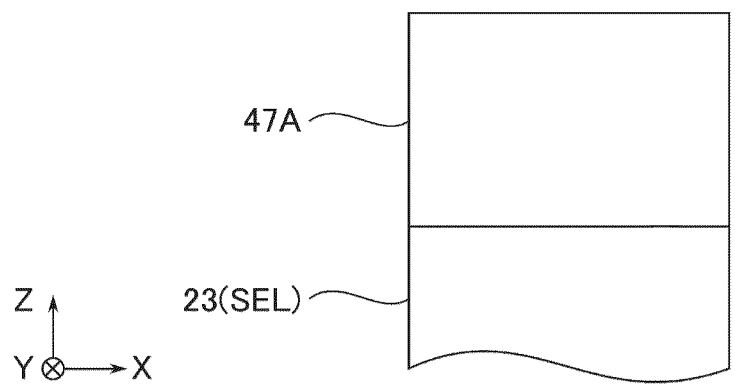
FIG. 6 is a cross-sectional view of a cross-sectional structure of a middle electrode that constitutes a memory cell of the magnetic memory device according to the embodiment, in the middle of a manufacturing process.

First, as shown in FIG. 6, the structure up to the element layer 23 is formed above the substrate 20. Consequently, the non-magnetic layer 47A is provided on the upper surface of the element layer 23. The non-magnetic layer 47A is a layer containing an element equivalent to the element contained in the non-magnetic layer 47. In other words, the non-magnetic layer 47A may contain carbon (C), for example. The non-magnetic layer 47A may further include nitride (N). The non-magnetic layer 47A is provided in such a manner that its film thickness is greater than that of the non-magnetic layer 47. The surface roughness of the upper surface of the element layer 23 is very coarse. For this reason, the surface roughness of the non-magnetic layer 47A is influenced by the surface roughness of the upper surface of the element layer 23.

Figure 7:
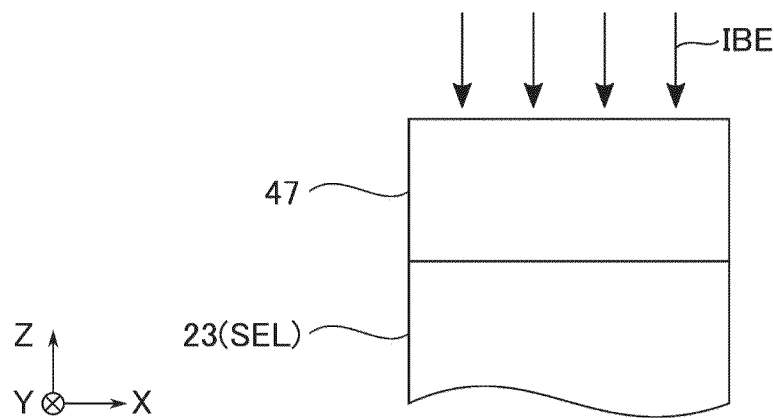
FIG. 7 is a cross-sectional view of a cross-sectional structure of a middle electrode that constitutes a memory cell of the magnetic memory device according to the embodiment, in the middle of a manufacturing process.

For this reason, the upper surface of the non-magnetic layer 47A is processed by, for example, etching processing using an ion beam (IBE), as shown in FIG. 7. The non-magnetic layer 47 is thus formed. The surface roughness of the non-magnetic layer 47 is finer than that of the non-magnetic layer 47A.

Figure 8:
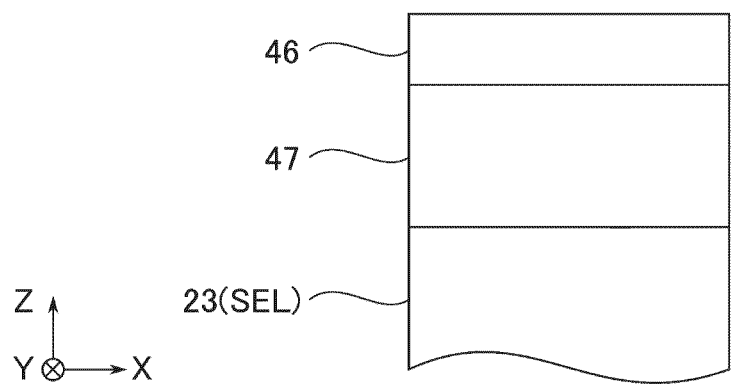
FIG. 8 is a cross-sectional view of a cross-sectional structure of a middle electrode that constitutes a memory cell of the magnetic memory device according to the embodiment, in the middle of a manufacturing process.

Subsequently, as shown in FIG. 8, the non-magnetic layer 46 is formed on the upper surface of the non-magnetic layer 47. The non-magnetic layer 46 is formed by, for example chemical vapor deposition (CVD) or physical vapor deposition (PVD) using magnetron sputtering. As a power source in the case where PVD is adopted, a direct current (DC) power source, a radio frequency (RF) power source, a pulse RF power source, or the like may be adopted. If containing a metal oxide, the non-magnetic layer 46 may be formed by annealing or plasma processing in an oxygen atmosphere. If containing a metal nitride, the non-magnetic layer 46 may be formed by annealing or plasma processing in an nitrogen atmosphere.

Figure 9:
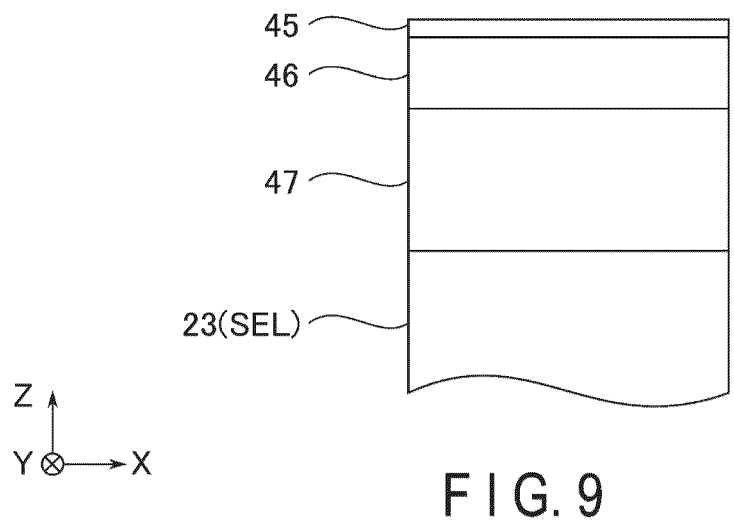
FIG. 9 is a cross-sectional view of a cross-sectional structure of a middle electrode that constitutes a memory cell of the magnetic memory device according to the embodiment, in the middle of a manufacturing process.

Subsequently, as shown in FIG. 9, the non-magnetic layer 45 is formed by oxidization of the upper surface of the non-magnetic layer 46.

Figure 10:
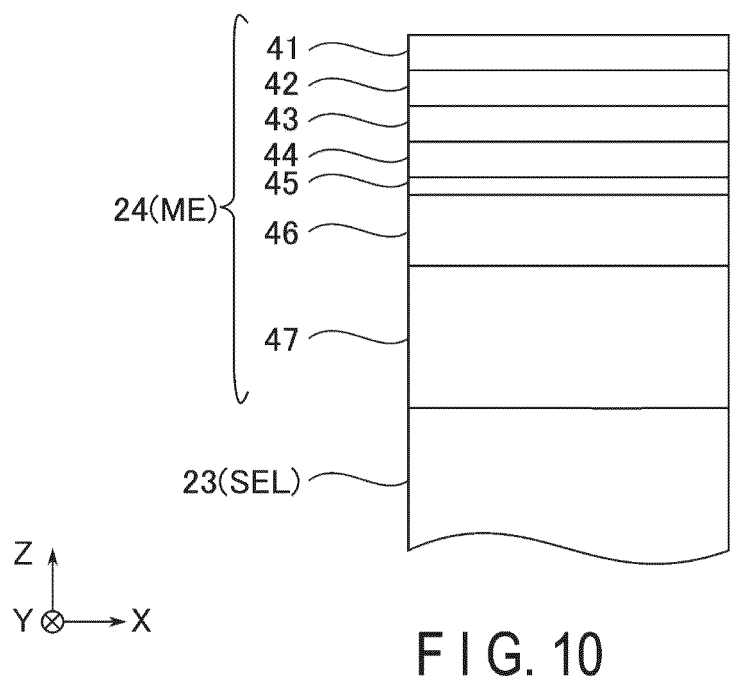
FIG. 10 is a cross-sectional view of a cross-sectional structure of a middle electrode that constitutes a memory cell of the magnetic memory device according to the embodiment, in the middle of a manufacturing process.

Subsequently, as shown in FIG. 10, the non-magnetic layer 44, the non-magnetic layer 43, the non-magnetic layer 42, and the non-magnetic layer 41 are formed on the upper surface of the non-magnetic layer 45 in this order.

The electrode layer 24 functioning as a middle electrode ME is thus formed.

1.3 Advantageous Effects of Embodiment

According to the embodiment, the non-magnetic layer 46 has an amorphous structure. It is thereby possible for the non-magnetic layer 46 to mitigate the influence given by the layers located below the non-magnetic layer 46 on the crystal structure of the layers located above the non-magnetic layer 46. The non-magnetic layer 46 contains a metal oxide or a metal nitride. For this reason, the non-magnetic layer 46 may take a chemically stable structure. For this reason, the diffusion of impurities contained in the non-magnetic layer 47 to the magnetoresistance effect element MTJ can be suppressed. The magnetic properties of the magnetoresistance effect element MTJ can be thereby improved.

The non-magnetic layer 45 is obtained by oxidization of the layers located above the non-magnetic layer 46. Thus, the non-magnetic layer 45 contains an oxide. For this reason, the non-magnetic layer 45 can suppress diffusion of impurities contained in the non-magnetic layer 47 into the magnetoresistance effect element MTJ. The magnetic properties of the magnetoresistance effect element MTJ can be further improved.

2. Examples and Comparative Examples

Examples and comparative examples performed in connection with the foregoing embodiment are described hereinafter.

First Comparative Example

Figure 11:
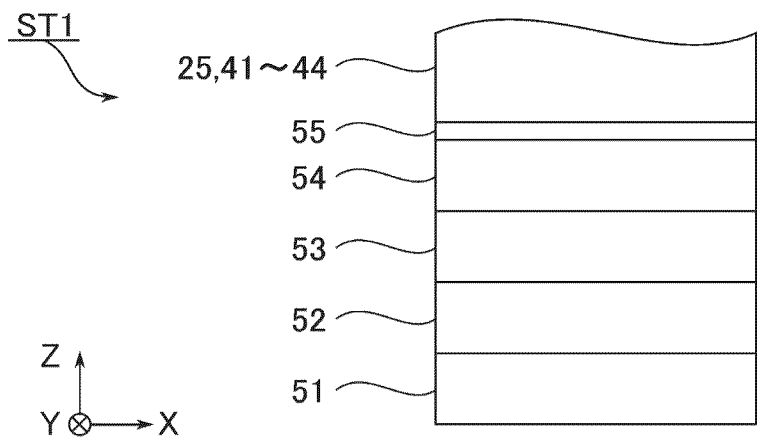
FIG. 11 is a cross-sectional view showing a cross-sectional structure of a memory cell according to a first comparative example.

FIG. 11 is a cross-sectional view showing a cross-sectional structure of a memory cell according to a first comparative example. FIG. 11 shows a structure ST1 in which layers respectively corresponding to a bottom electrode BE, a switching element SEL, a middle electrode ME, and a magnetoresistance effect element MTJ are stacked on a substrate.

The structure ST1 is formed by stacking a substrate 51, a non-magnetic layer 52, an element layer 53, a non-magnetic layer 54, a non-magnetic layer 55, a non-magnetic layer 44, a non-magnetic layer 43, a non-magnetic layer 42, a non-magnetic layer 41, and an element layer 25 in this order.

The substrate 51 is a thermal oxide film that can be obtained by a heat treatment of a silicon substrate. The substrate 51 contains silicon oxide ($SiO_2$).

The non-magnetic layer 52 is provided on the upper surface of the substrate 51. The non-magnetic layer 52 is an electric conductive film having non-magnetic properties. The non-magnetic layer 52 contains a compound used as a bottom electrode BE. Specifically, the non-magnetic layer 52 contains a titanium nitride (TiN).

The element layer 53 is provided on the upper surface of the non-magnetic layer 52. The element layer 53 contains a compound used as a switching element SEL. Specifically, the element layer 53 contains a compound of arsenic, silicon, and oxygen (As—Si—O).

The non-magnetic layer 54 is provided on the upper surface of the element layer 53. The non-magnetic layer 54 is an electric conductive film having non-magnetic properties. The non-magnetic layer 54 contains a compound used as the non-magnetic layer 47 in the middle electrode ME. Specifically, the non-magnetic layer 54 contains carbon (C) and nitride (N).

On the lower surface of the non-magnetic layer 54, the non-magnetic layer 55 is provided. The non-magnetic layer 55 is an electric conductive film having non-magnetic properties. The non-magnetic layer 55 contains carbon (C). The non-magnetic layer 55 is formed by oxidizing the upper surface of the non-magnetic layer 54 while the upper surface is in a post-deposition state.

On the upper surface of the non-magnetic layer 55, a non-magnetic layer 44, a non-magnetic layer 43, a non-magnetic layer 42, a non-magnetic layer 41, and an element layer 25 are provided in this order, similarly to the memory cell MC according to the embodiment.

With the above-described structure, the structure ST1 corresponding to the memory cell MC according to the first comparative example is formed.

Comparative Example 2

Figure 12:
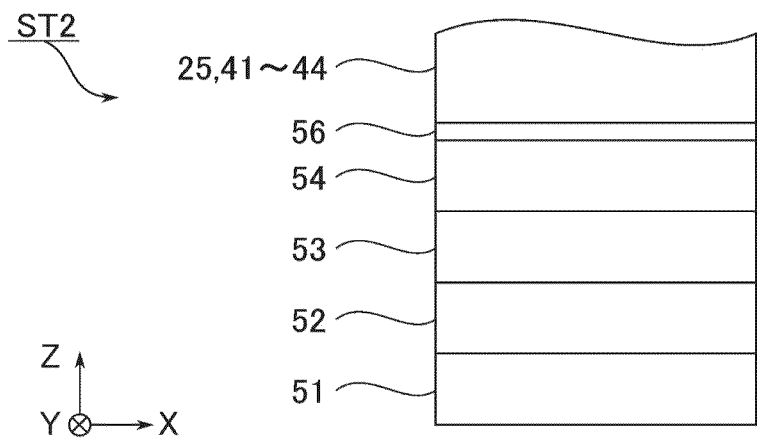
FIG. 12 is a cross-sectional view showing a cross-sectional structure of a memory cell according to a second comparative example.

FIG. 12 is a cross-sectional view showing a cross-sectional structure of a memory cell according to a second comparative example. FIG. 12 shows a structure ST2 in which layers respectively corresponding to a bottom electrode BE, a switching element SEL, a middle electrode ME, and a magnetoresistance effect element MTJ are stacked on a substrate.

The structure ST2 is formed by stacking a substrate 51, a non-magnetic layer 52, an element layer 53, a non-magnetic layer 54, a non-magnetic layer 56, a non-magnetic layer 44, a non-magnetic layer 43, a non-magnetic layer 42, a non-magnetic layer 41, and an element layer 25 in this order.

As the substrate 51, the non-magnetic layer 52, the element layer 53, and the non-magnetic layer 54 are equivalent to that in the first comparative example, description is omitted.

On the lower surface of the non-magnetic layer 54, the non-magnetic layer 56 is provided. The non-magnetic layer 56 is an electric conductive film having non-magnetic properties. The non-magnetic layer 56 contains an oxide of carbon (C). The non-magnetic layer 56 is obtained by oxidization of the upper layer of the non-magnetic layer 54.

On the upper surface of the non-magnetic layer 56, a non-magnetic layer 44, a non-magnetic layer 43, a non-magnetic layer 42, a non-magnetic layer 41, and an element layer 25 are provided in this order, similarly to the memory cell MC according to the embodiment.

With the above-described structure, the structure ST2 corresponding to the memory cell MC according to the second comparative example is formed.

Example

Figure 13:
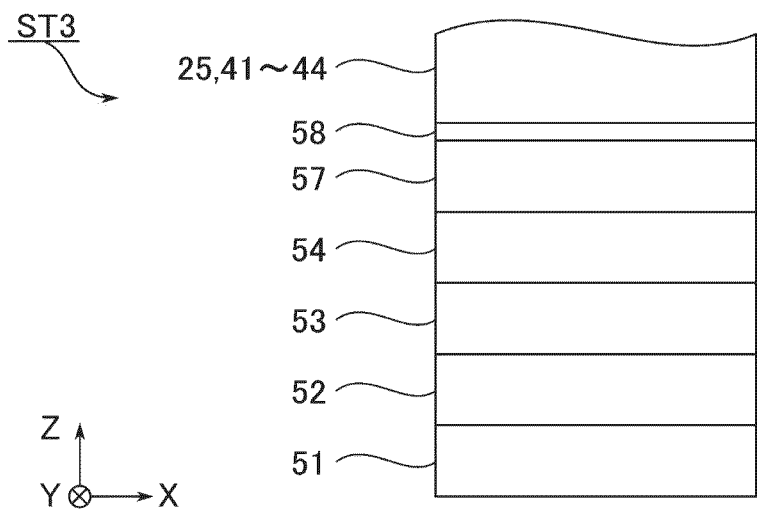
FIG. 13 is a cross-sectional view showing a cross-sectional structure of a memory cell according to an example.

FIG. 13 is a cross-sectional view showing a cross-sectional structure of a memory cell according to an example. FIG. 13 shows a structure ST3 in which layers respectively corresponding to a bottom electrode BE, a switching element SEL, a middle electrode ME, and a magnetoresistance effect element MTJ are stacked on a substrate.

The structure ST3 is formed by stacking a substrate 51, a non-magnetic layer 52, an element layer 53, a non-magnetic layer 54, a non-magnetic layer 57, a non-magnetic layer 58, a non-magnetic layer 44, a non-magnetic layer 43, a non-magnetic layer 42, a non-magnetic layer 41, and an element layer 25 in this order.

As the substrate 51, the non-magnetic layer 52, the element layer 53, and the non-magnetic layer 54 are equivalent to that in the first comparative example and the second comparative example, description is omitted.

On the lower surface of the non-magnetic layer 54, the non-magnetic layer 57 is provided. The non-magnetic layer 57 is an electric conductive film having non-magnetic properties. The non-magnetic layer 57 contains a compound used as the non-magnetic layer 46 in the middle electrode ME. Specifically, the non-magnetic layer 57 contains WSiN.

On the lower surface of the non-magnetic layer 57, the non-magnetic layer 58 is provided. The non-magnetic layer 58 is an electric conductive film having non-magnetic properties. The non-magnetic layer 58 contains a compound used as the non-magnetic layer 45 in the middle electrode ME. Specifically, the non-magnetic layer 58 contains an oxide of WSiN. The non-magnetic layer 58 is obtained by oxidization of the upper layer of the non-magnetic layer 57.

On the upper surface of the non-magnetic layer 58, a non-magnetic layer 44, a non-magnetic layer 43, a non-magnetic layer 42, a non-magnetic layer 41, and an element layer 25 are provided in this order, similarly to the memory cell MC according to the embodiment.

With the above-described structure, the structure ST3 corresponding to the memory cell MC according to the example is formed.

(Result)

FIG. 14 is a diagram showing a result of comparison of characteristics of a memory cell according to the example to those of a memory cell according to each of the first comparative example and the second comparative example. In FIG. 14, the row "Ra" shows a surface roughness Ra of the upper surface of each of the non-magnetic layer 55 of the first comparative example, the non-magnetic layer 56 of the second comparative example, and the non-magnetic layer 58 of the example. The row "Hex" shows a magnetization fixing force Hex of an SAF structure of the magnetoresistance effect element MTJ in each of the first comparative example, the second comparative example, and the example.

As shown in FIG. 14, the surface roughness Ra increases in the order of the first comparative example, the second comparative example, and the example. This is because a length of time taken for natural oxidization increases in the order of the first comparative example, the second comparative example, and the example.

Normally, the finer the surface roughness of the middle electrode ME is, the more the crystal orientation in an SAF structure formed in an upper layer is increased; therefore, the magnetization fixing force Hex of the SAF structure is improved. In other words, from the viewpoint of improving the magnetization fixing force Hex in the SAF structure, a fine surface roughness of the middle electrode ME is advantageous. In contrast, the magnetization fixing force Hex of the SAF structure increases in the order of the first comparative example, the second comparative example, and the example.

According to a comparison between the first comparative example and the second comparative example, the film thickness of the non-magnetic layer 56 is significantly thicker than that of the non-magnetic layer 55 because of an amorphous surface due to oxidization. This suggests that an effect of suppressing a phenomenon of diffusion of impurities contained in the non-magnetic layer 54 to the SAF structure that occurs during annealing has increased.

According to a comparison between the second comparative example and the example, the non-magnetic layer 57 is provided between the non-magnetic layer 54 and the SAF structure. This suggests that an effect of suppressing a phenomenon of diffusion of impurities contained in the non-magnetic layer 54 to the SAF structure that occurs during annealing has increased.

Thus, the comparison suggests that the effect of improving a magnetization fixing force Hex along with an improvement in suppression of impurities diffusion exceeds the effect brought by degradation of a magnetization fixing force Hex along with degradation of the surface roughness Ra.

3. Others

In the foregoing embodiment, an example where the magnetoresistance effect element MTJ has a top-free structure in which the storage layer SL is located above the reference layer RL (in other words, a bottom SAF structure in which the shift cancelling layer SCL is located above the reference layer RL) was described; however, the embodiment is not limited to this example. For example, the magnetoresistance effect element MTJ may have a bottom-free structure in which the storage layer SL is located lower than the reference layer RL (in other words, a top SAF structure in which the shift cancelling layer SCL is located above the reference layer RL).

FIG. 15 is a cross-sectional view of a cross-sectional structure of a magnetoresistance effect element and a middle electrode according to a modification. FIG. 15 corresponds to FIG. 5 in the embodiment. FIG. 15 shows a part of the element layer 23, the electrode layer 24 provided on the upper surface of the element layer 23, and an element layer 25A provided on the upper surface of the electrode layer 24. Since the structures of the element layer 23 and the electrode layer 24 are equivalent to those of the embodiment, the description is omitted.

As shown in FIG. 15, the element layer 25A used as a magnetoresistance effect element MTJ includes a ferromagnetic layer 31A, a non-magnetic layer 32A, a ferromagnetic layer 33A, a non-magnetic layer 34A, and a ferromagnetic layer 35A. The ferromagnetic layer 31A, the non-magnetic layer 32A, the ferromagnetic layer 33A, the non-magnetic layer 34A, and the ferromagnetic layer 35A are composed of the materials equivalent to those of the ferromagnetic layer 31, the non-magnetic layer 32, the ferromagnetic layer 33, the non-magnetic layer 34, and the ferromagnetic layer 35, and have functions equivalent to those of these layers. In other words, the ferromagnetic layer 31A, the non-magnetic layer 32A, the ferromagnetic layer 33A, the non-magnetic layer 34A, and the ferromagnetic layer 35A are used as a storage layer SL, a tunnel barrier layer TB, a reference layer RL, a spacer layer SP, and a shift cancelling layer SCL, respectively. Since the structure of the middle electrode ME according to the modification is equivalent to that in the embodiment, the structure of the modification can achieve the same advantageous effects as those in the embodiment.

While certain embodiments have been described, these embodiments have been presented by way of example only, and are not intended to limit the scope of the invention. Indeed, the embodiments described herein may be embodied in a variety of other forms; furthermore, various omissions, substitutions and changes in the form of the embodiments described herein may be made without departing from the spirit of the inventions. The embodiments and modifications are included in the scope and spirit of the invention and are included in the scope of the claimed inventions and their equivalents.

What is claimed is:

1. A magnetic memory device comprising a memory cell, the memory cell including:
   a switching element;
   a magnetoresistance effect element; and
   an electrode that electrically couples the switching element to the magnetoresistance effect element,
   wherein the electrode includes:
     a first non-magnetic layer being in contact with the switching element; and
     a second non-magnetic layer provided on a side opposite to a side on which the switching element is provided with respect to the first non-magnetic layer, and
   the second non-magnetic layer has an amorphous structure and contains a metal oxide or a metal nitride.

2. The magnetic memory device of claim 1, wherein the second non-magnetic layer contains at least one compound selected from WSiN, WSiO, SiN, SiB, AlO, NiCr, TiN, InO, CuSi, WN, and TaN.

3. The magnetic memory device of claim 1, wherein the first non-magnetic layer contains carbon (C).

4. The magnetic memory device of claim 3, wherein the first non-magnetic layer further contains nitride (N).

5. The magnetic memory device of claim 1, wherein the electrode further includes a third non-magnetic layer that is in contact with the second non-magnetic layer on a side opposite to a side on which the first non-magnetic layer is provided with respect to the second non-magnetic layer, and
   the third non-magnetic layer contains an oxide of a compound contained in the second non-magnetic layer.

6. The magnetic memory device of claim 5, wherein the electrode further includes a fourth non-magnetic layer provided on a side opposite to a side on which the second non-magnetic layer is provided with respect to the third non-magnetic layer, and
   the fourth non-magnetic layer contains hafnium (Hf) and boron (B).

7. The magnetic memory device of claim 6, wherein the electrode further includes a fifth non-magnetic layer provided on a side opposite to a side on which the third non-magnetic layer is provided with respect to the fourth non-magnetic layer, and
   the fifth non-magnetic layer contains tantalum (Ta).

8. The magnetic memory device of claim 7, wherein the electrode further includes a sixth ferromagnetic layer provided on a side opposite to a side on which the fourth non-magnetic layer is provided with respect to the fifth non-magnetic layer, and
   the sixth non-magnetic layer contains platinum (Pt).

9. The magnetic memory device of claim 8, wherein
the electrode further includes a seventh non-magnetic layer provided on a side opposite to a side on which the fifth non-magnetic layer is provided with respect to the sixth non-magnetic layer, and
the seventh non-magnetic layer includes silicon (Si) and boron (B).

10. The magnetic memory device of claim 1, wherein
the magnetoresistance effect element is provided on a side opposite to a side on which a substrate is provided with respect to the switching element.

11. The magnetic memory device of claim 1, wherein
the magnetoresistance effect element includes:
  a first ferromagnetic layer;
  a second ferromagnetic layer;
  a third ferromagnetic layer provided on an opposite side on which the first conductive layer is provided with respect to the second ferromagnetic layer;
  an eighth non-magnetic layer provided between the first ferromagnetic layer and the second ferromagnetic layer; and
  a ninth non-magnetic layer provided between the second ferromagnetic layer and the third ferromagnetic layer, and
the eighth non-magnetic layer contains an oxide of magnesium (Mg).

12. The magnetic memory device of claim 11, wherein
the ninth non-magnetic layer contains an element selected from the group consisting of ruthenium (Ru), osmium (Os), rhodium (Rh), iridium (Ir), vanadium (V), and chrome (Cr).

13. The magnetic memory device of claim 11, wherein
the third ferromagnetic layer is provided between a substrate and the second ferromagnetic layer.

14. The magnetic memory device of claim 11, wherein
the first ferromagnetic layer is provided between a substrate and the second ferromagnetic layer.

15. The magnetic memory device of claim 11, wherein
the second ferromagnetic layer and the third ferromagnetic layer are coupled in an antiferromagnetic manner.

16. The magnetic memory device of claim 1, wherein
the switching element is a 2-terminal type switching element.

* * * * *